(12) United States Patent
Hindryckx et al.

(10) Patent No.: US 7,872,587 B2
(45) Date of Patent: Jan. 18, 2011

(54) DISPLAY SYSTEM FOR AN AGRICULTURAL HARVESTING MACHINE

(75) Inventors: Kris Hindryckx, Diksmuide (BE); Bart M. A. Missotten, Winksele Herent (BE); Dries M. J. Depreitere, Koekelare (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/586,095

(22) Filed: Sep. 17, 2009

(65) Prior Publication Data

US 2010/0071329 A1 Mar. 25, 2010

(30) Foreign Application Priority Data

Sep. 19, 2008 (GB) ................. 0817172.0

(51) Int. Cl.
*G08B 21/00* (2006.01)

(52) U.S. Cl. .............. 340/684; 460/6; 56/10.2 R

(58) Field of Classification Search .......... 701/50, 701/1, 36, 212, 207; 340/601, 988, 684; 460/4, 6; 702/129, 5; 56/10.2 R
See application file for complete search history.

(56) References Cited

U.S. PATENT DOCUMENTS

| | | | | |
|---|---|---|---|---|
| 5,666,793 A | * | 9/1997 | Bottinger | .......... 56/10.2 R |
| 5,712,782 A | * | 1/1998 | Weigelt et al. | .......... 701/50 |
| 6,068,059 A | * | 5/2000 | Bajema et al. | .......... 171/130 |
| 6,119,442 A | | 9/2000 | Hale | |
| 6,167,337 A | | 12/2000 | Haack et al. | |
| 6,216,071 B1 | * | 4/2001 | Motz | .......... 701/50 |
| 7,670,218 B2 | * | 3/2010 | Behnke et al. | .......... 460/4 |
| 2003/0216158 A1 | | 11/2003 | Bischoff | |
| 2009/0099737 A1 | * | 4/2009 | Wendte et al. | .......... 701/50 |

FOREIGN PATENT DOCUMENTS

EP 1714822 A2 * 10/2006

* cited by examiner

*Primary Examiner*—Árpád Fábián-Kovács
(74) *Attorney, Agent, or Firm*—Michael G. Harms; Patrick M. Sheldrake

(57) ABSTRACT

A control system for a combine harvester having a crop processing system with a control panel for enabling an operator of the combine harvester to set a plurality of operating parameters of the crop processing system that affect the harvesting performance, and a plurality of sensors for determining prevailing values of crop quality parameters. The control system includes a data processor having a display for communicating information visually to the operator and acts to determine when a crop quality parameter exceeds an unacceptability threshold. Following such determination, the control system displays to the operator an operating parameter of which adjustment is recommended in order to restore the crop quality parameter to an acceptable value. The recommended operating parameter is derived from data stored in a look-up table within the data processor.

9 Claims, 1 Drawing Sheet

DISPLAY SYSTEM FOR AN AGRICULTURAL HARVESTING MACHINE

CROSS REFERENCE TO RELATED APPLICATIONS

This Patent Application claims priority under 35 U.S.C. §119 to GB 08.17.172.0, filed on Sep. 19, 2008 titled, "CONTROL SYSTEM FOR AN AGRICULTURAL HARVESTING MACHINE" and having KRIS HINDRYCKX, BART M. A. MISSOTTEN and DRIES M. J. DEPREITERE as inventors. The full disclosure of GB 08.17.172.0 is hereby fully incorporated herein by reference.

FIELD OF THE INVENTION

The present invention relates to a control system for an agricultural harvesting machine, such as a combine harvester, having a crop processing system, a control panel for enabling an operator of the combine harvester to set a plurality of operating parameters of the crop processing system that affect the harvesting performance, and a plurality of sensors for determining prevailing values of crop quality parameters.

BACKGROUND OF THE INVENTION

In a combine harvester, crop is cut from a field and fed to a multistage crop processing system which acts to separate the grain from the straw and chaff. Ideally all the grain should be collected whole and stored in a tank while the straw and the chaff should be discharged from the back of the harvester.

To separate the grain from the remainder of the crop material, the crop is first fed to a threshing system which comprises a cylinder or drum that rotates along a concave. This separates the straw from the grain and chaff. In conventional combines the straw is carried to the back of the harvester by so-called straw walkers. In rotary type harvesters the cylinder is positioned generally lengthwise of the harvester and comprises a front threshing section and a rear separating section along which the straw is spiraled rearwardly. The threshed straw is discharged as a swath for subsequent baling or else it is chopped and spread evenly over the ground.

The grain is separated from the chaff by a cleaning system in which it tossed on sieves as a fan blows air over the sieves. The chaff is blown away while the grain drops through the sieves and is collected in a tray from which it is then transferred to a grain, tank by a suitable conveyor. Tailings, i.e. grain ears that comprise grain that has not been separated from the straw, fail to drop through the grain sieves and eventually drop instead onto a separate tray from which they are recycled through the threshing mechanism.

It is not believed necessary for an understanding of the present invention to describe the construction of a combine harvester in any greater detail but more information on the construction of combine harvesters can be obtained from numerous prior art references, such as U.S. Pat. No. 4,344,443.

In any design of combine harvester, there are several operating parameters of the crop processing system that will affect the harvesting quality. In particular, if the parameter settings are incorrect for the current crop and/or harvesting conditions, the grain kernels may be broken, the grain collected in the grain tank may contain too much material other than grain (known as MDG), there may be an excess of tailings discharged from the cleaning system and there may be reduced processing efficiency resulting in grain loss.

Parameters such as grain purity, grain breakage, tailings quantity and grain loss, which are herein referred to as "crop quality parameters", can be measured by known sensors so that the operator may be warned of poor crop processing performance. However, conveying all the necessary information to the operator has resulted in ever more complex user interfaces making it difficult even for experienced operators to decide what to do when a warning is received that the crop processing is not operating optimally. This problem is exacerbated by the fact that harvesters are often driven by less skilled operators because of the shortage of skilled labour.

OBJECT OF THE INVENTION

The present invention seeks therefore to provide a control system with an improved interface that allows the harvesting quality to be optimised even when the combine harvester is driven by a non-expert operator.

SUMMARY OF THE INVENTION

According to the present invention, there is provided a control system for an agricultural harvesting machine having a crop processing system, a control panel for enabling an operator of the harvesting machine to set a plurality of operating parameters of the crop processing system that affect the harvesting performance, and a plurality of sensors for determining prevailing values of crop quality parameters, wherein the control system comprises a data processor having a display for communicating information visually to the operator, the control system being operative to determine when a crop quality parameter exceeds an unacceptability threshold, and, following such determination, to display to the operator an operating parameter of which adjustment is recommended in order to restore the crop quality parameter to an acceptable value, the recommended operating parameter being derived from data stored in a look-up table within the data processor.

The data processor preferably additionally includes an input device to enable the data processor to receive instructions from the operator and is operative upon receipt of an input from the operator consenting to a recommended adjustment to an operating parameter to implement the recommendation automatically.

Advantageously, the look-up table includes for each crop type default settings of a group of operating parameters by which any given crop quality parameter is affected and the data processor is operative to select from the group the operating parameter of which the prevailing setting deviates most from the stored default setting.

The implementation of the recommended correction may suitably act to reduce the difference between the prevailing setting and the default setting of the operating parameter by a fixed proportion of the difference, e.g. to halve this difference. This avoids situations where jumping to the default setting is likely to cause overshoot and sub-optimal operation. In case the new prevailing setting would still not bring the quality parameters within the required limits, a further correction recommendation can be generated bringing the setting closer to the default value in a next proportional step. This approach tempers any reaction to deviating quality parameters.

The default settings stored in the look-up table may either be factory settings, or settings chosen by an experienced operator which take into account prevailing ambient factors, such a temperature and humidity, that affect the harvesting. Likewise, the acceptability thresholds may either be factory preset or selected by an experienced operator. In this way, the invention allows an experienced operator to set the combine and the sensitivities of the losses, tailings, MDG, broken grain . . . and then to leave the harvester to a less experienced operator. When an alarm condition occurs, the less experienced operator does not have to make a phone call, but will be prompted by the on-board data processor as to what corrections are needed to rectify the sensed problem.

In the preferred embodiment of the invention, the screen warning of non-optimal performance has a "Help" button which, when selected by the operator, will cause a recommended action to be displayed on the screen. The operator may then opt to implement the recommendation or disregard it.

BRIEF DESCRIPTION OF THE DRAWINGS

The invention will now be described further, by way of example, with reference to the accompanying drawings, in which.

DETAILED DESCRIPTION OF THE PREFERRED EMBODIMENT(S)

The drawings show a display device that serves as the interface between the control system of the present invention and the vehicle operator. The display device essentially comprises a housing 10, a display screen 12 on which images created by the data processor of the control system are displayed and various navigation and selection buttons 14. The display device is itself known and described in some detail in EP 1714822, which in the interest of brevity is imported herein by reference in its entirety. Alternatively the display device may comprise a touch screen, in which case no navigation and selection buttons are required.

Figure 1:
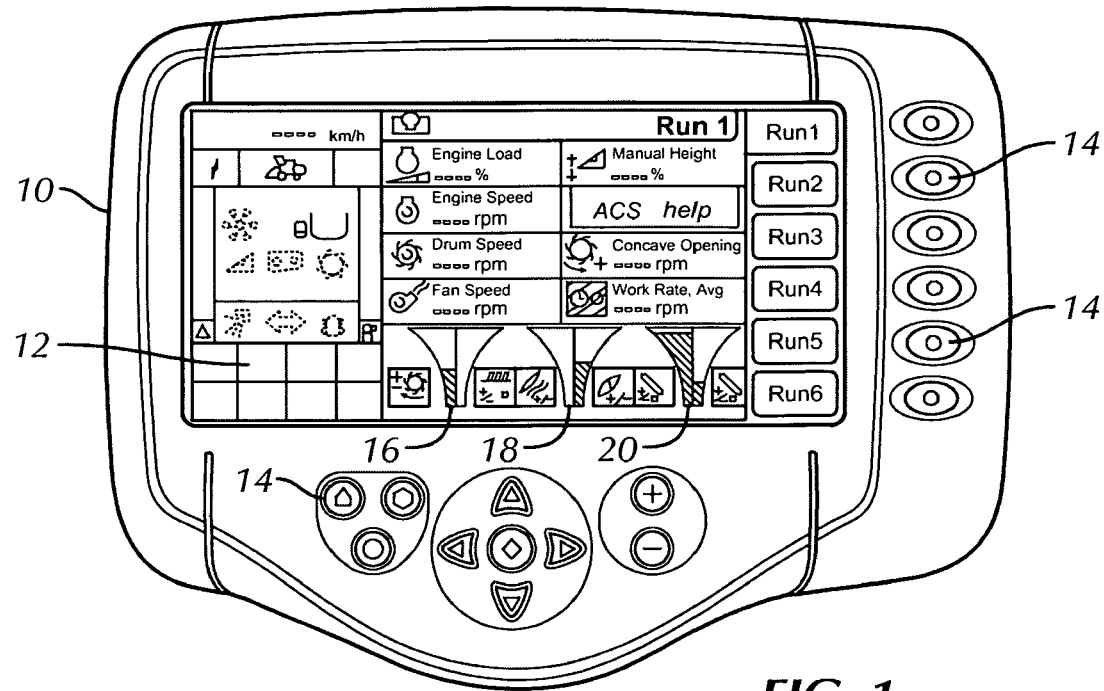
FIG. 1 is a view of a display screen showing the image that is presented to the operator during a harvesting operation.

The image displayed in FIG. 1 is divided into two regions. The region on the left is concerned with functions such as vehicle speed, that are not particularly relevant to the present invention and need not be described. The right hand side of the screen on the other hand is concerned with the operating parameters of the crop processing system that affect harvesting performance.

The prevailing values of various operating parameters that affect harvesting performance are displayed in cells of a table, each alongside a symbolic icon. The cells of the left hand column of the table in the drawing are the engine load, engine speed, the speed of the threshing cylinder (marked drum speed) and the speed of the fan of the cleaning system. In the right hand column, the cells display the manual height setting (of the header), the concave opening (the distance between the concave and the threshing cylinder) and the work rate expressed in hectares per hour. Scrolling through the display may reveal other cells showing other operating parameters such as openings of the top and bottom sieves, which also affect crop quality.

In addition, the right hand column of the table includes a cell which is marked "ACS help", this being a cell that can be selected by the operator to obtain help with Automatic Crop Setting, as will be explained in more detail below.

As well as displaying the current values of operating parameters that affect the harvesting performance, the image displayed on the screen in FIG. 1 contains graphical representations of the prevailing values of sensed crop quality parameters. The latter representations take the form of three "funnels" 16, 18 and 20 displayed beneath the table of operating parameters.

Each funnel is divided into halves and each half represents a different sensed crop quality parameter. The sensed parameter is represented by a symbolic icon located adjacent the respective side of the funnel. The left half of the funnel 16 indicates grain loss in the threshing and separating system and its right half indicates grain loss in the cleaning system. The two halves of the funnel 18 are associated with the quality of the collected grain, the left half indicating MDG and the right half broken grain kernels. The third funnel indicates the quantity or flow rate (T/h) of tailings and the grain content in the tailings flow respectively.

The funnel halves are thermometer-like scales that are illuminated progressively as the values of the indicated crop quality parameters increase. When a parameter is well within the acceptability threshold, the parameter is displayed in green. As the value of the parameter rises towards the acceptability threshold, its colour turns to yellow and when the acceptability threshold is exceeded its colour turns to red. This colour coding allows an operator to ascertain at a glance if all the crop quality parameters lie within acceptable limits.

In the case of the values displayed in FIG. 1, the left half of the right funnel 20 will be shown in red indicating that the flow rate of tailings is excessive. An experienced operator may well at this stage know which settings to change to restore the harvesting performance to an acceptable value but a less experienced operator would not know what to do and would in many cases resort to reducing the work rate by reducing the forward speed of the combine harvester to avoid operating the crop processing equipment near the limit of its ability. Alternatively, the operator may telephone an experienced operator for instructions. Either way, the time taken to complete a given harvesting task will inevitably be increased.

Figure 2:
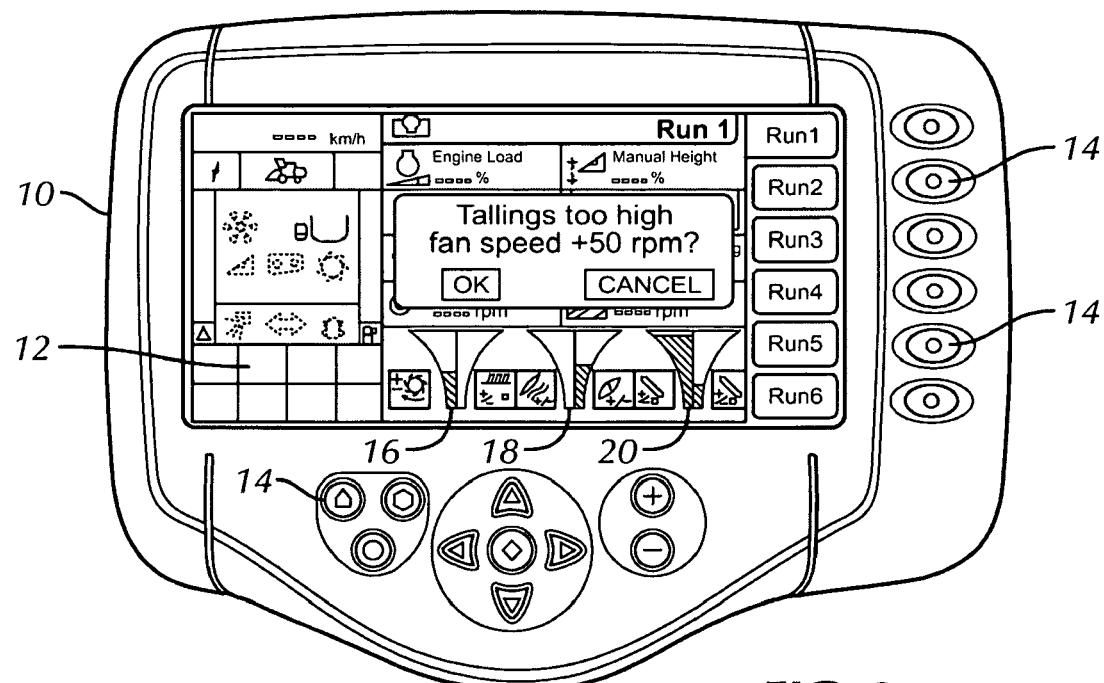
FIG. 2 is a second view of the display screen showing the assistance provided by a control system of the present invention to the operator when an excess of tailings is detected.

In the illustrated embodiment of the invention, at the same time as warning the operator that the prevailing value of a crop quality parameter is unacceptable, the ACS help cell of the table is highlighted for selection by the operator using the buttons 14. In case a touch screen is used, the operator may just touch the help cell itself. If the operator asks for assistance in either way, the screen display changes to that shown in FIG. 2. Here the nature of the problem is indicated to the operator in words in a window and an action is recommended to solve the problem. The recommendation in this case is to increase the fan speed by 50 rpm. At the same time, the operator is asked to indicate whether or nor this recommendation is acceptable. If "OK" is selected, the change is implemented and no further recommendation is made for, say, a minute to allow the change to take effect.

The display device is connected to a data processor which receives input from various sensors to indicate the prevailing settings of the operating parameters and the prevailing values of the crop quality parameters. The data processor accesses a look-up table in which there are stored for each crop quality parameter an acceptability threshold and the various operating parameters by which it is affected. Default values for the various operating parameters are also stored for each crop type, either as a factory setting or by an experience operator. The acceptability thresholds are likewise set either a factory presets or by an experienced operator. Scrolling through a menu brings each of the prevailing settings on screen and allows for selection of the factory setting or further modification by the operator.

When an acceptability threshold is exceeded, the prevailing values of the different operating parameters which are associated in the look-up table with the crop quality parameter in question are compared with the stored or preset default values. The various difference values are compared with one another and the operating parameter for which the existing setting deviates most from the stored default value is chosen for adjustment. The amount of adjustment that is recommended has the effect of reducing the difference between the setting and the default value by a fixed proportion, e.g., 50%. If the problem persists after sixty seconds, the process is repeated but a different operating parameter may now be found to deviate most from the stored default value and other settings may be adjusted. In case the same parameter is still deviating most, the system generates an adjustment recommendation that reduces the current difference between the prevailing setting and the default value by the same proportion.

The crop quality parameters that can act as inputs to the data processor are
  Separation losses
  Cleaning losses
  Return volume
  Broken grain (from appropriate sensor, such as New Holland GrainCam™, if installed)
  Grain purity (from appropriate sensor, such as New Holland GrainCam™, if installed)

The operating parameters that can be auto-adjusted by the data processor to remedy sensed problems are:
  Concave clearance
  Threshing cylinder/drum rpm
  Cleaning fan rpm
  Top sieve opening
  Bottom sieve opening In addition to automatic adjustment, the data processor can also recommend adjustments to be made manually or maintenance work that should be carried out to rectify a problem that cannot be overcome solely by adjusting the settings of the operating parameters. These manual adjustment or maintenance recommendations are to be displayed when the operating parameters are close to their default values and the crop quality parameter is still not at an acceptable level.

The auto-adjustments and maintenance recommendations for the crop quality parameters described above with reference to the drawings may be as follows:

Grain Cracking

Auto Adjustable Parameters
  Increase concave clearance
  Reduce rotor rpm
  Recommendations
  Increase forward speed/cut lower
  Open de-awning plates/clean concave
  Adjust grain elevator chain tension
  Adjust feeder chain/feeder auger height Grain Impurities Auto Adjustable Parameters
  Increase cleaning fan rpm
  Lower rotor rpm
  Increase concave clearance
  Open top sieve
  Close bottom sieve Recommendations
  Clean the sieves Grain Loss in Threshing System Auto Adjustable Parameters
  Increase rotor speed
  Decrease concave opening Recommendations
  Clean concaves and separator grades
  Install/add agitator pins
  Review whether the crop is ready for harvest Grain Loss in Cleaning System Auto Adjustable Parameters
  Reduce fan speed
  Open concave distance
  Reduce rot or rpm
  Open top sieve
  Open bottom sieve Recommendations
  Set cleaning shoe at high rpm
  Recalibrate self levelling cleaning shoe Excessive Return Volume (Tailings)

Auto Adjustable Parameters
  Increase fan rpm
  Open bottom sieve
  Reduce rot or rpm
  Increase concave opening
  Reduce fan rpm Recommendations
  Clean sieves The system may provide for harvester operation in one out of three modes. A first "manual" mode would involve full operator controls, without the system making any suggestions on how to correct for any discrepancies. However, the "ACS help" button is still available and can be selected at any moment to receive suggestions for better harvester operation. The suggested actions will still be executed upon approval by the operator.

In a second "ACS help" mode the system will alarm the operator upon exceeding one or more thresholds. Pressing the "ACS help" button will display the suggestions for interventions, which will be executed automatically upon the operator giving his consent, as described above.

A third "Full ACS" mode would automatically execute the interventions proposed by the data processor. The latter mode would be equivalent to the operator approving each suggestion made in the second mode. However, the operator will be warned of every automatic change and the display will show the message "Stop automatic control?" giving him the opportunity to interrupt and possibly reverse the automatic change.

The invention claimed is:

1. A control system for an agricultural harvesting machine having a crop processing system, a control panel for enabling an operator of the harvesting machine to set a plurality of operating parameters of the crop processing system that affect the harvesting performance, and a plurality of sensors for determining prevailing values of crop quality parameters, wherein the control system comprises a data processor having a display for communicating information visually to the operator, the control system being operative to determine when a crop quality parameter exceeds an unacceptability threshold, and, following such determination of the crop quality parameter, to display to the operator an operating parameter of which adjustment is recommended in order to restore the crop quality parameter to an acceptable value, the recommended operating parameter being derived from data stored in a look-up table within the data processor, wherein the look-up table includes for each crop quality parameter default settings of a group of operating parameters by which the crop quality parameter is affected, when an acceptability threshold is exceeded, the prevailing values of the different operating parameters associated with the determined crop quality parameter, are compared by the data processor with the default settings thereby resulting in a plurality of difference values, the plurality of difference values are compared with one another, wherein the data processor selects the operating parameter from the group of operating parameters having the largest difference value and displays the operating parameter with a recommended corrective action.

2. A control system as claimed in claim 1, wherein implementation of the recommended correction acts to reduce the difference between the prevailing setting and the default setting of the modified operating parameter by a predetermined proportion.

3. A control system as claimed in claim 2, wherein the predetermined proportion is equal to 50%.

4. A control system as claimed in claim 1, wherein the stored default settings are selectable by an operator.

5. A control system as claimed in claim 1, wherein the stored unacceptability thresholds are selectable by an operator.

6. A control system as claimed in claim 1, having a manual operating mode in which recommendations for improving the harvesting performance are provided to the operator only upon request, the recommendations, if approved, being manually implemented by the operator.

7. A control system as claimed in claim 1, having an assisted operating mode in which the operator is warned by an alarm when one of the thresholds is exceeded, and, upon receiving a request for assistance from the operator, the control system displays a recommended action which is implemented by the control system only after receiving a consent signal from the operator.

8. A control system as claimed in claim 1, having an automatic operating mode for warning the operator when a threshold is exceeded, indicating to the operator a recommended course of action and automatically implementing the recommended course of action each time a threshold is exceeded, unless an overriding command is received from the operator.

9. A control system as claimed in claim 1, wherein after a time period of at least 60 seconds, the data processor evaluates if the acceptability threshold is still exceeded, wherein if the acceptability threshold is still exceeded then the prevailing values of the different operating parameters associated with the identified crop quality parameter, are compared again by the data processor with the default settings resulting in a plurality of difference values, the data processor again compares the plurality of difference values with one another, wherein the data processor selects the operating parameter from the group of operating parameters having the largest difference value and displays the operating parameter with a recommended corrective action.

* * * * *